(12) United States Patent
Atamna

(10) Patent No.: US 9,191,368 B2
(45) Date of Patent: Nov. 17, 2015

(54) SYSTEMS AND METHODS FOR SECURE REMOTE ACCESS

(71) Applicant: General Electric Company, Schenectady, NY (US)

(72) Inventor: Youcef Atamna, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/072,414

(22) Filed: Nov. 5, 2013

(65) Prior Publication Data

US 2015/0128244 A1 May 7, 2015

(51) Int. Cl.
*H04L 29/06* (2006.01)
*H04L 29/08* (2006.01)

(52) U.S. Cl.
CPC .......... *H04L 63/029* (2013.01); *H04L 63/0428* (2013.01); *H04L 63/0823* (2013.01); *H04L 63/166* (2013.01); *H04L 67/06* (2013.01)

(58) Field of Classification Search
USPC ........................................................ 726/11
See application file for complete search history.

(56) References Cited

U.S. PATENT DOCUMENTS

| 7,430,759 | B2 * | 9/2008 | Piepiorra et al. ................ 726/11 |
| 7,565,526 | B1 | 7/2009 | Shaw et al. |
| 8,595,831 | B2 * | 11/2013 | Skare ............................. 726/22 |
| 2003/0126468 | A1 * | 7/2003 | Markham ..................... 713/201 |
| 2008/0109889 | A1 * | 5/2008 | Bartels ............................. 726/7 |
| 2009/0064304 | A1 | 3/2009 | Cohen et al. |
| 2009/0222885 | A1 * | 9/2009 | Batke et al. ...................... 726/1 |
| 2013/0018939 | A1 | 1/2013 | Chawla et al. |
| 2013/0317659 | A1 * | 11/2013 | Thomas et al. ............... 700/286 |

FOREIGN PATENT DOCUMENTS

| CN | 201188626 Y | 1/2009 |
| WO | 2007044832 A2 | 4/2007 |
| WO | 2013012654 A2 | 1/2013 |

OTHER PUBLICATIONS

EP Search Report issued on Mar. 11, 2015 in connection with corresponding EP application 14191891.2.

* cited by examiner

*Primary Examiner* — Mahfuzur Rahman
(74) *Attorney, Agent, or Firm* — Sutherland Asbill & Brennan LLP

(57) ABSTRACT

Embodiments of the disclosure can include systems and methods for secure remote transfers. The onsite monitoring system secure file transfer solution can allow for transferring operational data by an onsite system behind a firewall to a central monitoring and diagnostic infrastructure by sending asynchronous, concurrent, parallel files over a port using a previously opened connection. The asynchronous TLS tunneling based remote desktop protocol solution is uni-directional because the communication ports are typically open outbound only.

15 Claims, 7 Drawing Sheets

SYSTEMS AND METHODS FOR SECURE REMOTE ACCESS

TECHNICAL FIELD

This disclosure generally relates to communication security, and in particular to systems and methods for secure remote access.

BACKGROUND

Monitoring and diagnostic (M&D) centers can provide numerous services for power plant units as well as other assets. Such services may include asset monitoring, event tracking, trip event reporting, root cause classification, forced outage detection, diagnostics and reporting with various recommendations to a site. Raw operational data as well as post-processed data can be derived from analytics which may be used by various engineering teams for performance and reliability studies, warranty support, and engineering research and development.

However, new requirements are being imposed for the large set of existing power plants requiring relatively secure file transfers. Many sites need to comply with North American Electric Reliability Corporation (NERC) or other regulatory security requirements and other communication security challenges. In addition, many of these sites have limited bandwidth connections and relatively unstable or otherwise unreliable links.

Typically, the onsite monitoring is located within the power plant infrastructure. The onsite network is usually protected by firewalls and a proxy at the plant edge that may prevent inbound connections and thus enforcing that the onsite monitoring is non-routable. Furthermore, all standard bi-directional TCP/HTTP communication ports are usually blocked by the firewall to ensure the security of the system. In addition, secure remote access is needed to provide monitoring and diagnostic users with the ability to remotely access the onsite monitoring and perform certain administration and management tasks.

Current communications typically require a bi-directional based communication ports schema, and current data transport technologies are generally not able to adequately deal with dial-up or low bandwidth network topologies (e.g., significant latency, bandwidth management under stress conditions). Furthermore, a uni-directional general purpose file transfer solution is not available.

In order to meet new and ever growing customer security requirements, relatively secure file transfer solutions are needed to provide secure data transfer for transport of data between an onsite monitoring system and a central monitoring and diagnostic infrastructure. A secure file transfer package is needed to be deployed to support onsite monitoring sites with limited bandwidth connections and relatively unstable or otherwise unreliable links that can comply with NERC or other regulatory requirements and other communication security challenges.

BRIEF DESCRIPTION OF THE DISCLOSURE

Some or all of the above needs may be addressed by certain embodiments of the disclosure. According to an example embodiment, there is disclosed a method for encapsulating remote access session data. The method may include receiving, from an end user computer, a request for a remote connection to an onsite system behind a firewall, wherein the firewall prevents inbound connections. The method may further include initiating, by a central system, a session request message within a reply to a previous message from the onsite system, establishing a connection between the onsite system and a remote connection server, opening a secure tunnel at the central system by the onsite system, encrypting data for transmission by the onsite system, completing an authentication process by the onsite system, establishing a connection between the end user computer and the onsite system, and transferring the data from the central system to the onsite system.

In another embodiment, there is disclosed a system for encapsulating remote access session data. The system may include a central system operable to receive from an end user computer a request for a remote connection to an onsite system behind a firewall, wherein the firewall prevents inbound connections. The central system, in communication with the onsite system, may be operable to initiate a session request message within a reply to a previous message from the onsite system. The onsite system may be operable to connect to a remote desktop server, open a secure tunnel to the central system, encrypt data for transmission to the central system, complete an authentication process, and transmit the data to the central system.

In yet another embodiment, there is disclosed non-transitory computer readable media comprising instructions, which when executed by one or more processors, may receive, from an end user computer, a request for a remote connection to an onsite system behind a firewall, wherein the firewall prevents inbound connections, initiate a session request message within a reply to a previous message from the onsite system, establish a connection between the onsite system and a remote connection server, open a secure tunnel at the central system by the onsite system, encrypt data for transmission, complete an authentication process by the onsite system, establish a connection between the end user computer and the onsite system, and transfer the data from the central system to the onsite system.

Other embodiments, features, and aspects of the disclosure are described in detail herein and are considered a part of the claimed disclosure. Other embodiments, features, and aspects can be understood with reference to the following detailed description, accompanying drawings, and claims.

BRIEF DESCRIPTION OF THE FIGURES

References will now be made to the accompanying figures, which are not necessarily drawn to scale, and wherein.

DETAILED DESCRIPTION

Example embodiments of the disclosure now will be described more fully hereinafter with reference to the accompanying drawings, in which some, but not all embodiments are shown. Indeed, the disclosure may be embodied in many different forms and should not be construed as limited to the embodiments set forth herein; rather these embodiments are provided so that this disclosure will satisfy applicable legal requirements. Like numbers refer to like elements throughout.

To achieve secure remote file transfers supporting onsite monitoring of power plants, a new infrastructure combining various hardware, software, and networking technologies has been developed. Certain embodiments of the disclosure may have the technical effect of enabling asynchronous, service oriented, extraction of data from a repository on the onsite monitoring system and transferring data to a central storage repository for analytics processing. Another technical effect of certain embodiments of the disclosure may allow asynchronous, parallel, simultaneous downloading and uploading of files between designated servers in the central monitoring and diagnostic infrastructure 120 and the onsite monitoring system 110 while providing security, dynamic guarantee of service, and reliability features. Other embodiments of the disclosure may have the technical effect of enabling secure remote access to the onsite monitoring system and enabling the performance of certain administration and management tasks.

Figure 1:
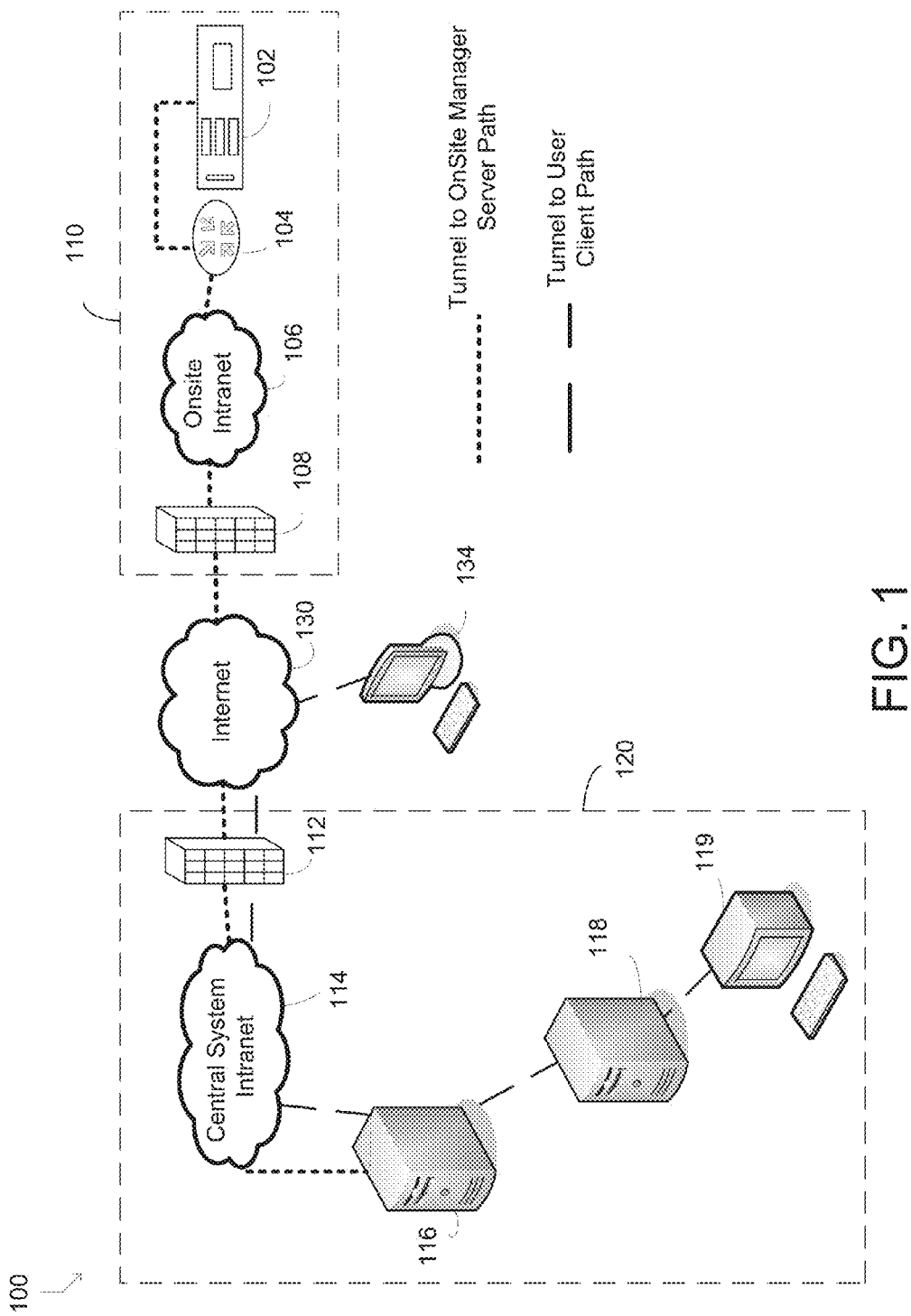
FIG. 1 is a schematic block diagram of an example system architecture for providing secure data transfer for transport of data between an onsite monitoring system and a central monitoring and diagnostic infrastructure in accordance with an embodiment of the disclosure.

Referring to FIG. 1 of the drawings, there is shown a schematic block diagram of an example system architecture 100 for providing secure data transfer for transport of data between an onsite monitoring system 110 and a central monitoring and diagnostic infrastructure 120.

The onsite monitoring system 110 may be implemented by using a Windows™ based platform (typically a high computing server), with various networking capabilities and may be collocated at the power plant site behind a corporate firewall 108. The onsite network 106 may be protected by firewalls 108 and a proxy 104 at the plant edge preventing inbound connections and thus enforcing that the onsite monitoring is non-routable. Furthermore, all standard bi-directional TCP/HTTP communication ports may be blocked by the firewall 108.

The onsite monitoring secure remote access solution may provide monitoring and diagnostic users 119, 134 with the ability to securely and remotely access the onsite monitoring system 110 and perform certain administration or management tasks. Communication security may be provided by integrating the HTTPS/TLS protocols stack with a customized software package referred to as an intelligent agent.

A user 119 utilizing the central system Intranet 114 or a remote user 134 connected to the outside Internet 130 may establish a connection to a remote enterprise server 118 by connecting to the central system Intranet 114 through firewall 112. The remote enterprise server 118 may establish a connection with an enterprise tunneling server 116. The users 119, 134 may then establish a user initiated remote desktop protocol (RDP) session with the onsite monitoring system 110. Communication security may be provided using a TLS/SSL based tunneling methodology encapsulating the remote access session data.

An M&D user 119 or a remote user 134 may request an RDP connection to the onsite monitoring system 110. Since the traffic port is uni-directional (open outbound only), the agent server 116 may initiate an RDP session request message within a reply to any previous message from an intelligent agent 102 residing on a server within the onsite monitoring system 110. The intelligent agent 102 then may connect to a RDP module within the onsite monitoring system 110.

The illustrated system 100 provides a secure remote access solution to allow the establishment of remote access services to the onsite management system. This asynchronous TLS tunneling based RDP solution is uni-directional by design because communication ports are typically open outbound only.

Figure 2:
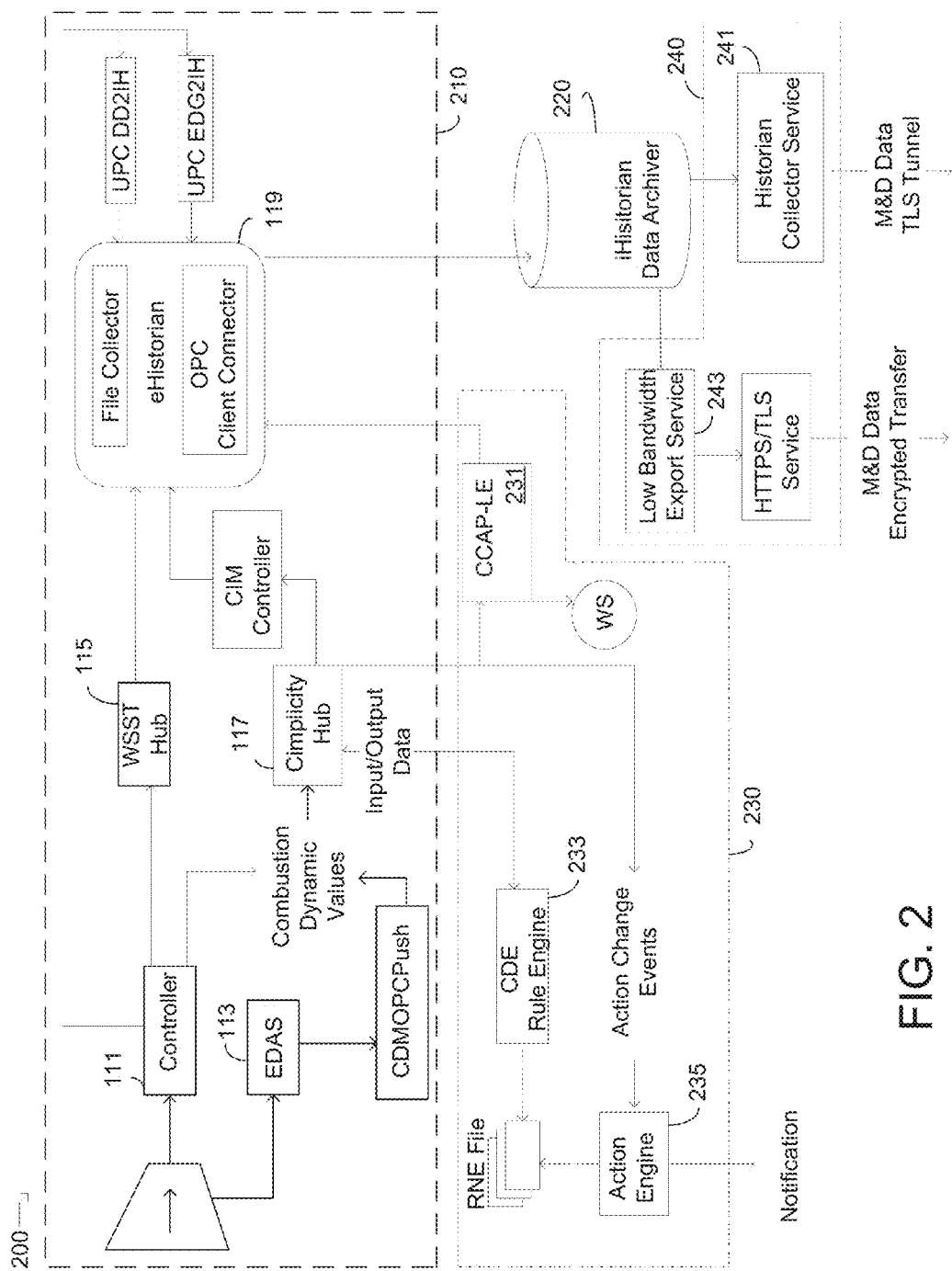
FIG. 2 illustrates a schematic block diagram of an example onsite monitoring system in accordance with an embodiment of the disclosure.

Referring to FIG. 2, illustrated is an example of an onsite monitoring (OSM) system 200 in accordance with an embodiment of the disclosure. The OSM system 200 may be implemented on a Windows™ based platform (typically a high performance server), with various networking capabilities and is collocated at the power plant site behind the corporate firewalls.

Data collection software modules 210 may be associated with the collection of the units' operational and dynamic data, such as temperature, pressure, flow rate, clearance (e.g., distance between two components) and vibration data of turbomachinery. Various types of controllers, based on network connectivity capabilities and raw data resolution, are used to interface with the units' sensors. The controller may range from the proprietary controllers 111 to standard Ethernet Data Acquisition Systems (EDAS) 113. The collected raw data may then be processed and transferred to other OSM modules via data hubs. The data hubs may collect tremendous volumes of real-time production information and perform supervisory automation along with delivery of reliable information to higher-level analytic applications. Such data hubs may include certain proprietary hubs such as WSST 115, CIMPLICITY 117 and the EHISTORIAN 119 collector modules. In addition, these modules can provide a combined source for data quality and time coherency.

The storage software modules 220 may be associated with data storage and archiving. The storage software module 220 can be a proprietary platform such as PROFICY HISTORIAN, and can provide the ability for local storage of time series data as well as processed data generated by the analytics outputs. It can also provide the ability to manage data quality using various compression and interpolation techniques.

The data processing modules 230 may be associated with data processing as well as events and alarms escalation. Analytics based data processing may be provided by a proprietary platform, such as CENTRAL CONDITION ASSESSMENT PLATFORM-LOCAL EDITION (CCAP-LE) 231 and continuous diagnostic engine (CDE) rule engine platform 233. Alarms and event escalation may be performed by an action engine 235 and may send notifications via email or web based services.

The transfer modules 240 may be associated with data transfer to the central monitoring and diagnostic system 120. Two types of transport mechanisms are generally available based on site specific security requirements, network topology, and available bandwidth. The first mechanism may leverage a historian collector 241 to collector service to provide real time data streaming transport. The second mechanism combines the services provided by a low bandwidth export service 243 and an intelligent agent for secure (one way traffic/push), asynchronous, concurrent, and reliable files transport.

Accordingly, at least one technical effect may enable low bandwidth and intelligent agent modules to provide secure, one way traffic, asynchronous, concurrent, and reliable files transport.

Figure 3:
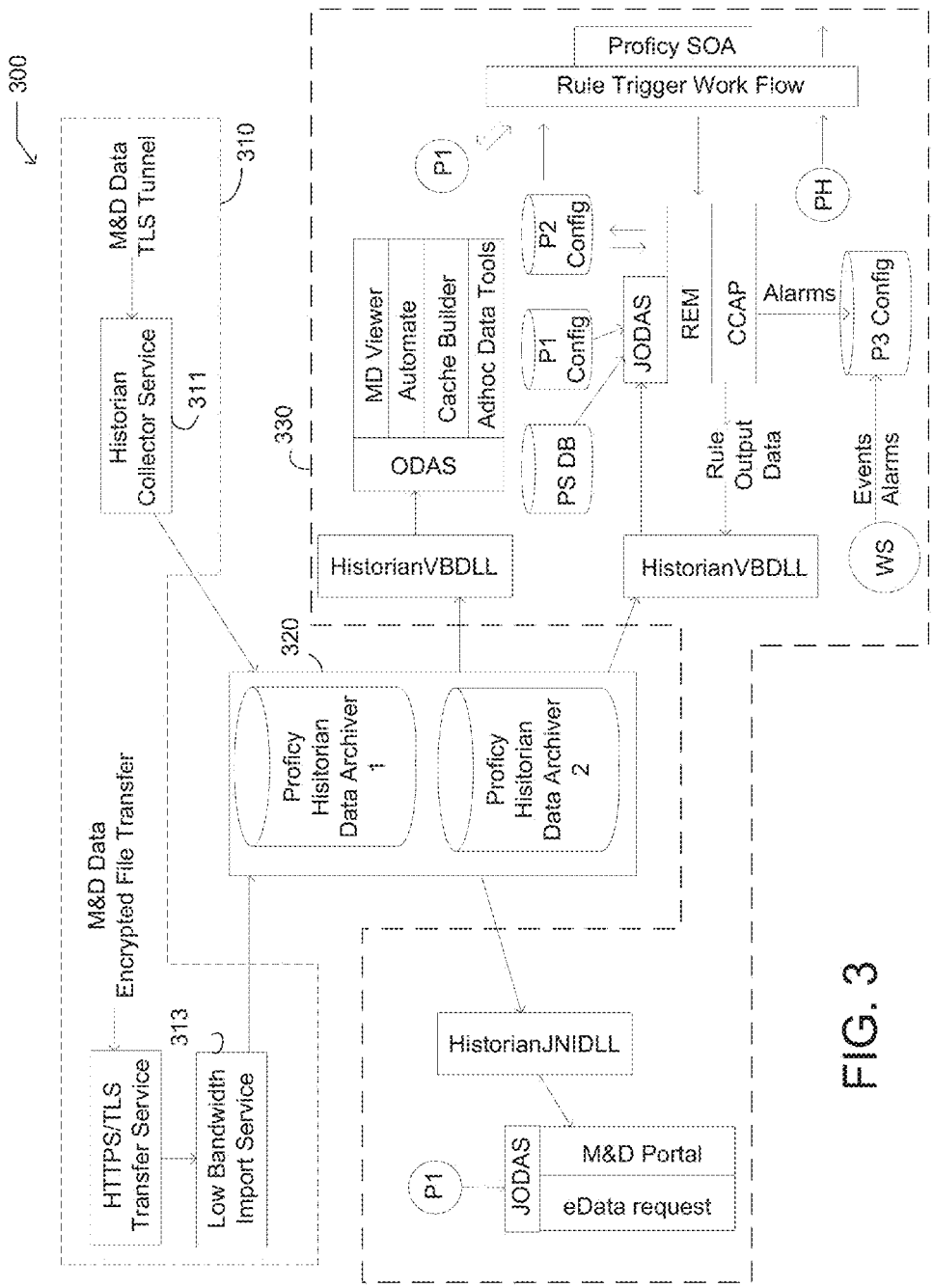
FIG. 3 illustrates a schematic block diagram of an example central monitoring and diagnostic infrastructure in accordance with an embodiment of the disclosure.

FIG. 3 illustrates an example central monitoring and diagnostic infrastructure 300 in accordance with an embodiment of the disclosure.

The central system transfer modules 310 may be associated with data transfer from the onsite system. Two types of transport mechanisms are generally available. The first mechanism may leverage a historian collector to collector service 311 to provide real time data streaming transport. The second mechanism may provide relatively low bandwidth import services 313 for a relatively secure (one way traffic/push), asynchronous, concurrent, and reliable files transport.

The central storage software modules 320 may be associated with the data storage and archiving of the time series data initially collected and transferred from the OSM's fleet. This software platform may provide the ability for storage of time series data as well as processed data generated by the analytics outputs. The central storage software module 320 may provide enterprise-wide data historian services that archive and distribute tremendous volumes of real-time production information at extremely high speeds. It may also provide the ability to manage data quality using various compression and interpolation techniques.

The central storage software modules 320, such as PROFICY HISTORIAN, may be operable to compare years of historical data to real-time data to allow for a myriad of analysis possibilities. This solution may provide the tools to compare assets across a fleet and over long periods of time to better understand how equipment and processes are running versus how they should be running.

The remaining set of illustrated modules 330 are a collection of configuration databases, monitoring and diagnostic operation visualization tools, and analytics rule engines as well as the analytics runtime environment and associated application programming interfaces and service oriented architectures.

Figure 4:
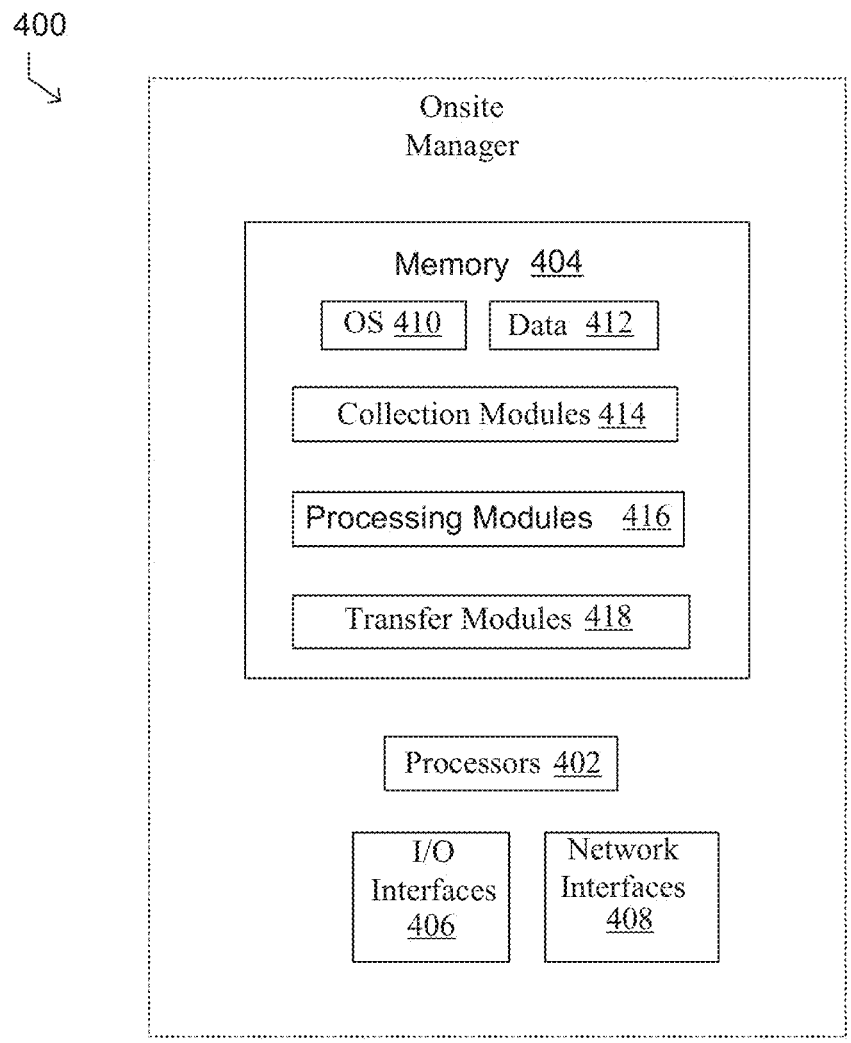
FIG. 4 illustrates a functional block diagram of an example onsite monitoring system in accordance with an embodiment of the disclosure.

Referring to FIG. 4, illustrated is a functional block diagram of an example onsite manager 400 in accordance with an embodiment of the disclosure. The manager 400 may include one or more processors 402, one or more memories 404, one or more input/output ("I/O") interfaces 406, and one or more network interfaces 408. The manager 400 may include other devices not depicted.

The one or more processors 402 may include one or more cores and are configured to access and execute at least in part instructions stored in the one or more memories 404. The one or more memories 404 can include one or more computer-readable storage media ("CRSM"). The one or more memories 404 may include, but are not limited to, random access memory ("RAM"), flash RAM, magnetic media, optical media, and so forth. The one or more memories 404 may be volatile in that information is retained while providing power or non-volatile in that information is retained without providing power.

The one or more I/O interfaces 406 may also be provided in the manager 400. These I/O interfaces 406 can allow for coupling devices such as sensors, keyboards, mice, monitors, printers, external memories, and the like. The one or more I/O interfaces 406 may allow for coupling to various sensors and controllers that can provide operational data across the system.

The one or more network interfaces 408 may provide for the transfer of data between the manager 400 and another device directly such as in a peer-to-peer fashion, via a network, or both. The one or more network interfaces 408 may include, but are not limited to, personal area networks ("PANs"), wired local area networks ("LANs"), wide area networks ("WANs"), wireless local area networks ("WLANs"), wireless wide area networks ("WWANs"), and so forth. The one or more network interfaces 408 may utilize acoustic, radio frequency, optical, or other signals to exchange data between the manager 400 and other devices, The one or more memories 404 may store instructions or modules for execution by the one or more processors 402 to perform certain actions or functions. The following modules are included by way of illustration, and not as a limitation. Furthermore, while the modules are depicted as stored in the memory 404, in some implementations, these modules may be stored at least in part in external memory which is accessible to the manager 400 via the network interfaces 408 or the I/O interfaces 406. These modules may include an operating system ("OS") module 410 configured to manage hardware resources such as the I/O interfaces 406 and provide various services to applications or modules executing on the processor 402.

The collection modules 414 may be stored in the memory 404. The collection modules 414 may be configured to continuously acquire data from the one or more input devices and calculate various parameters. The collection modules 414 may be associated with the collection of the units' operational and dynamic data such as temperature, pressure, flow rate, clearance (e.g., distance between two components) and vibration data of turbo-machinery. Various types of controllers (based on network connectivity capabilities/raw data resolution) are used to interface with the units' sensors. The controllers can range from certain proprietary controllers, such as MARK controllers, to a standard Ethernet Data Acquisition System (EDAS). The collected raw data is then processed and transferred to other OSM modules via various data hubs. In addition, these modules may provide a combined source for data quality and time coherency. The collection module 414 may store the data and calculated estimates in the datastore 412.

The processing modules 416 may be configured to store and archive data. The software platform may provide the ability for local storage of time series data as well as processed data generated by the analytics outputs. It also may provide the ability to manage data quality using various compression and interpolation techniques.

The transfer modules 418 may be configured to transfer data to the central M&D system. A first mechanism may be configured for a collector to collector service that provides real time data streaming transport. A second mechanism may combine the services provided by a low bandwidth intelligent agent module for a secure (one way traffic/push), asynchronous, concurrent, and reliable files transport.

The manager 400 described above with reference to FIG. 4 is provided by way of example only. As desired, numerous other embodiments, systems, methods, apparatus, and components may be utilized to implement one or more or all of the functions of the manager 400.

Figure 5:
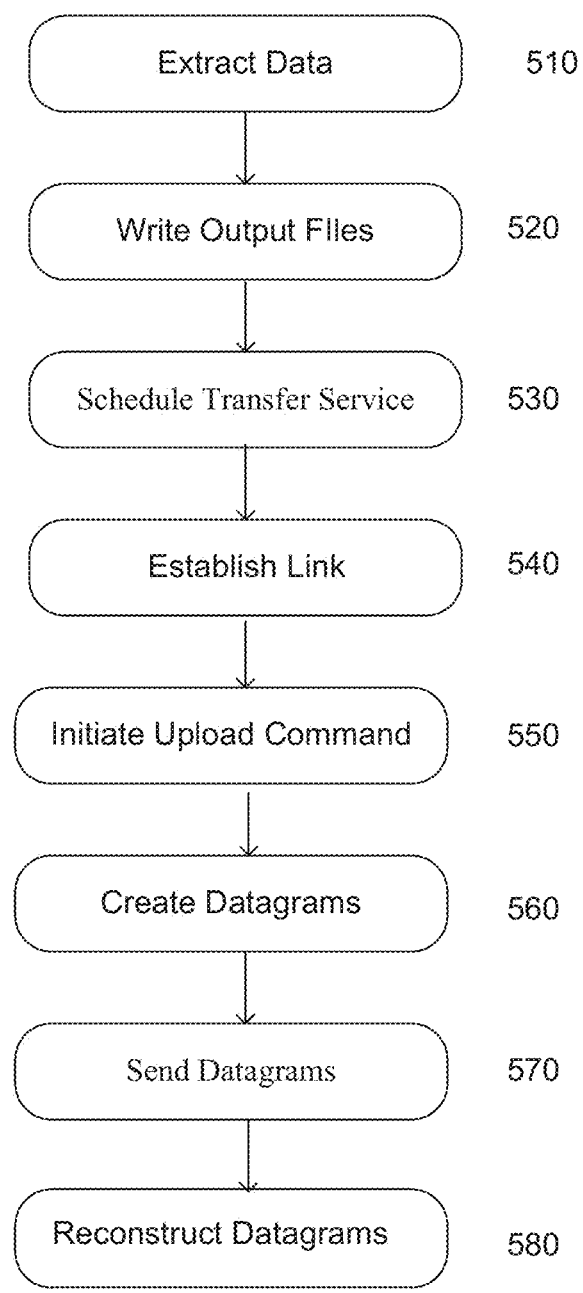
FIG. 5 is a flowchart illustrating an exemplary secure file upload of data between an onsite monitoring system and a central monitoring and diagnostic infrastructure in accordance with an embodiment of the disclosure.

FIG. 5 is a flowchart 500 illustrating an exemplary secure file upload of data between an onsite monitoring system and a central monitoring and diagnostic infrastructure in accordance with an embodiment of the disclosure.

In block 510, the low bandwidth export service may extract data from an archiver module. Block 510 is followed by block 520, in which the output files may be written to upload/download directories. In block 530, an asynchronous background intelligent transfer service may be scheduled.

In block 540, the intelligent agent may establish a secure (certificates based) uni-directional (using networking port) TLS/SSL encrypted link between the OSM and the associated central file transfer servers.

In block 550, the intelligent agent may initiate a command upload message for asynchronous, concurrent, parallel files upload. Block 560 follows block 550, in which the intelligent agent may create associated HTTPS datagrams and may send the datagrams serially over a preselected port in block 570. The data transport reliability is performed via checksum (for each chunk and on the complete file) as well as by the retransmit and fault tolerance mechanisms provided by the underlying transport protocol stack. Block 580 follows block 570, in which the HTTPS datagrams may be reconstructed by the agent server service and presented to the low bandwidth import service.

Figure 6:
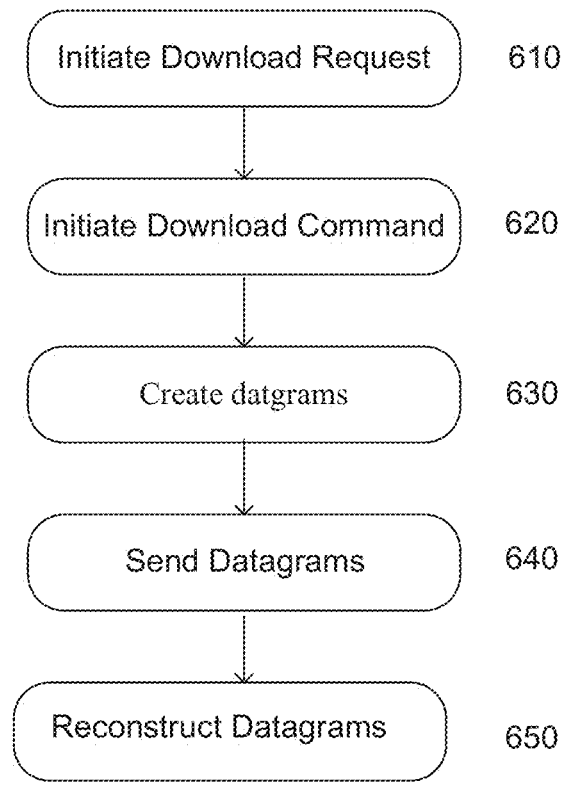
FIG. 6 is a flowchart illustrating an exemplary secure file download of data between an onsite monitoring system and a central monitoring and diagnostic infrastructure in accordance with an embodiment of the disclosure.

FIG. 6 is a flowchart 600 illustrating an exemplary secure file download of data between an onsite monitoring system and a central monitoring and diagnostic infrastructure in accordance with an embodiment of the disclosure.

In block 610, the agent server initiates a file download request message within a reply to any previous message from the intelligent agent since the pre-selected traffic port may be uni-directional (open outbound only). Block 610 is followed by block 620 in which the intelligent agent may initiate a download command message for asynchronous, concurrent, parallel files download. In block 630, the agent server creates the associated HTTPS datagrams and sends, in block 640, the datagrams serially over a port using the connection previously opened by the intelligent agent. The data transport reliability is performed by the agent server via checksum (for each chunk and on the complete file) as well as by the retransmit and fault tolerance mechanisms provided by the underlying transport protocol stack. Finally, in block 650, the HTTPS datagrams are reconstructed by the intelligent agent service and presented to the low bandwidth export service.

Figure 7:
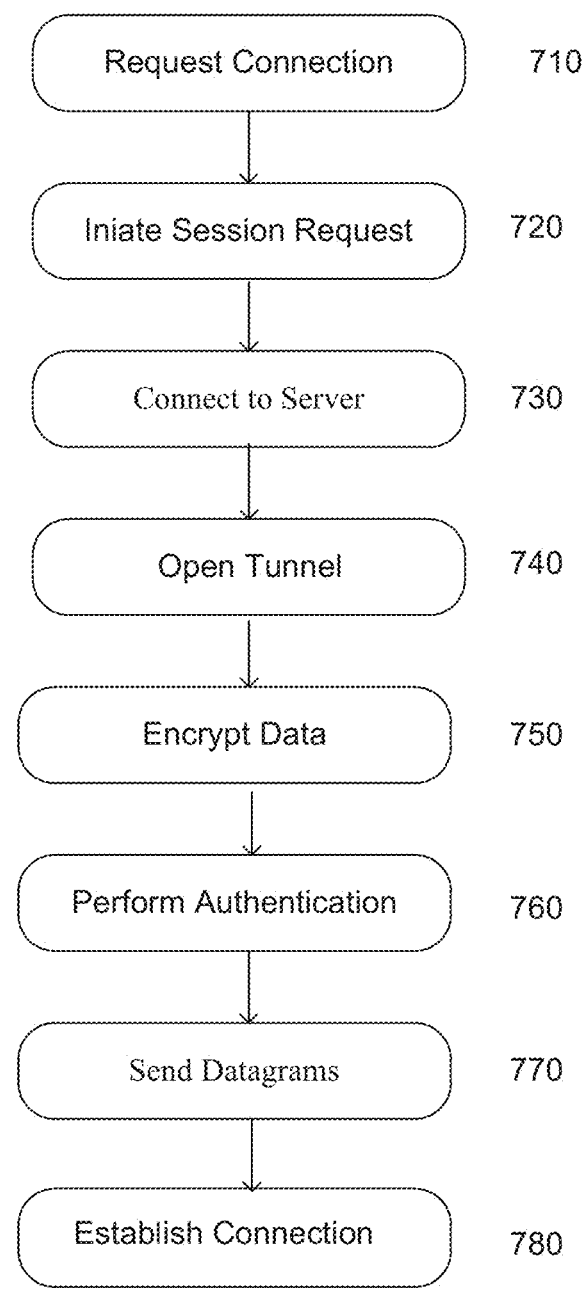
FIG. 7 is a flowchart illustrating an exemplary secure remote access to an onsite monitoring system.

FIG. 7 is a flowchart 700 illustrating an exemplary secure remote access to an onsite monitoring system. Communication security is provided using a TLS/SSL based tunneling methodology encapsulating the remote access session data.

In block 710, a user may request a remote desktop protocol (RDP) connection to the onsite monitoring system. In block 720, the agent server may initiate an RDP session request message within a reply to any previous message from the intelligent agent since the traffic port is uni-directional (open outbound only).

In block 730, the intelligent agent connects to the RDP server on the onsite monitoring system. Block 740 follows block 730, in which the intelligent agent opens a TLS/SSL tunnel at the agent server. In block 750, the data is encrypted using a validated crypto library, and in block 760, the intelligent agent completes the authentication process. Finally in blocks 770 the datagrams can be sent and in 780, the connection may be established. The end to end RDP connection may be established by connecting the intermediate connections between the onsite monitoring system RDP server, the intelligent agent, the agent server, and the end user computing device.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

This written description uses examples to disclose certain embodiments of the disclosure, including the best modes, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method for encapsulating remote access session data, comprising:
   receiving, from an end user computer, a request for a remote connection to an onsite system behind a firewall, wherein the firewall prevents inbound connections;
   initiating, by one or more onsite processors associated with a central system, a session request message within a reply to a previous message from the onsite system, wherein the request message is sent to a pre-selected traffic port that prevents non-outbound communications and blocks non-reply messages;
   receiving the request message by an intelligent software module residing on one or more onsite processors associated with the onsite system;
   establishing, by the intelligent software module, a connection between the onsite system and a remote connection server;
   opening a secure tunnel at the central system by the onsite system;
   encrypting data for transmission by the onsite system, wherein the data comprises operational information from a plurality of onsite controllers in communication with a plurality of sensors;
   completing an authentication process by the onsite system;
   establishing a connection between the end user computer and the onsite system; and
   transferring the data from the onsite system to the end user computer.

2. The method of claim 1, wherein opening a secure tunnel at the central system by the onsite system comprises using secure socket layer protocol or transport layer security.

3. The method of claim 1, wherein encrypting data for transmission comprises using a validated crypto library.

4. The method of claim 1, wherein the firewall prevents standard bi-directional transport control protocol communications.

5. The method of claim 1, wherein the end user computer is behind a central system firewall.

6. The method of claim 1, wherein the end user computer is not inside a central system firewall.

7. The method of claim 1, further comprising performing analytics and/or diagnostics on the data.

8. A system for encapsulating remote access session data, the system comprising:
   a central system with one or more computer processors operable to receive from an end user computer a request for a remote connection to an onsite system behind a firewall, wherein the firewall prevents inbound connections;
   the central system, in communication with the onsite system, and the one or more computer processors are operable to:
   initiate a session request message within a reply to a previous message from the onsite system, wherein the request message is sent to a pre-selected traffic port that prevents non-outbound communications and blocks non-reply messages; wherein the onsite system is operable to:
receive the request message by an intelligent software module residing on one or more onsite processors associated with the onsite system;
connect to a remote desktop server;
open a secure tunnel to the central system;
encrypt data for transmission to the central system, wherein the data comprises operational information from a plurality of onsite controllers in communication with a plurality of sensors;
complete an authentication process; and
transmit the data to the central system.

9. The system of claim 8, wherein to open a secure tunnel to the central system comprises using secure socket layer protocol or transport layer security.

10. The system of claim 8, wherein the firewall prevents standard bi-directional transport control protocol communications.

11. The system of claim 8, wherein a remote connection is established between the remote desktop server, the end user computer, the central system, and the onsite system.

12. The system of claim 8, wherein the end user computer is behind a central system firewall.

13. The system of claim 8, wherein the end user computer is not behind a central system firewall.

14. The system of claim 8, wherein the data comprises operational information from a plurality of onsite controllers.

15. One or more non-transitory computer readable media comprising instructions, which when executed by one or more processors, perform the following operations:
receive, from an end user computer, a request for a remote connection to an onsite system behind a firewall, wherein the firewall prevents inbound connections;
initiate, by a central system, a session request message within a reply to a previous message from the onsite system, wherein the request message is sent to a pre-selected traffic port that prevents non-outbound communications and blocks non-reply messages and is received by an intelligent software module residing on one or more onsite processors associated with the onsite system;
establish a connection between the onsite system and a remote connection server;
open a secure tunnel at the central system by the onsite system;
encrypt data for transmission, wherein the data comprises operational information from a plurality of onsite controllers in communication with a plurality of sensors;
complete an authentication process by the onsite system;
establish a connection between the end user computer and the onsite system; and
transfer the data from the central system to the onsite system.

* * * * *